Aug. 16, 1938.     J. F. HIGBEE     2,126,960
INDEPENDENT DUAL WHEEL DRIVE
Filed Sept. 28, 1936      4 Sheets-Sheet 1
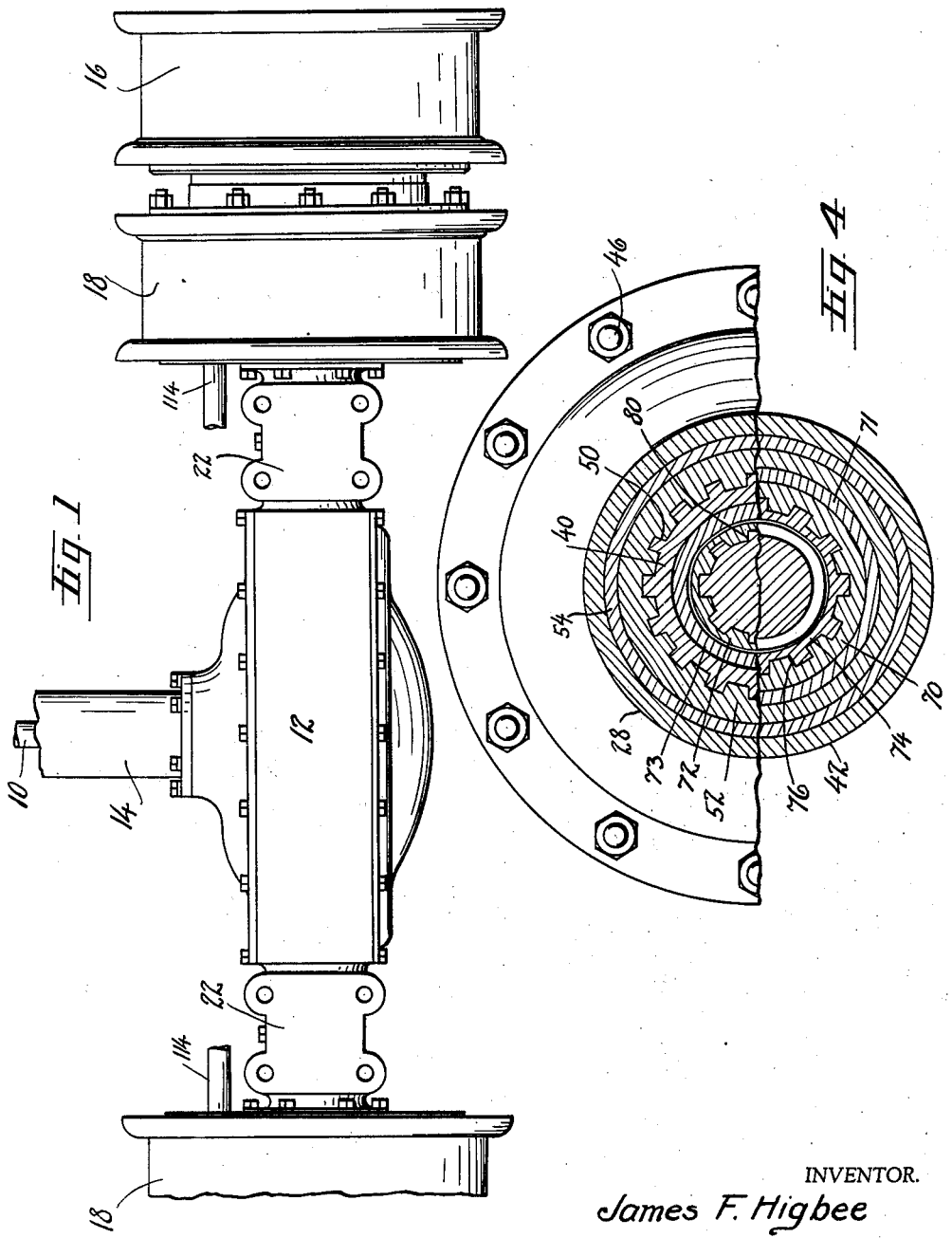
INVENTOR.
James F. Higbee
BY Parker & Burton
ATTORNEYS.

Aug. 16, 1938.   J. F. HIGBEE   2,126,960
INDEPENDENT DUAL WHEEL DRIVE
Filed Sept. 28, 1936   4 Sheets-Sheet 2
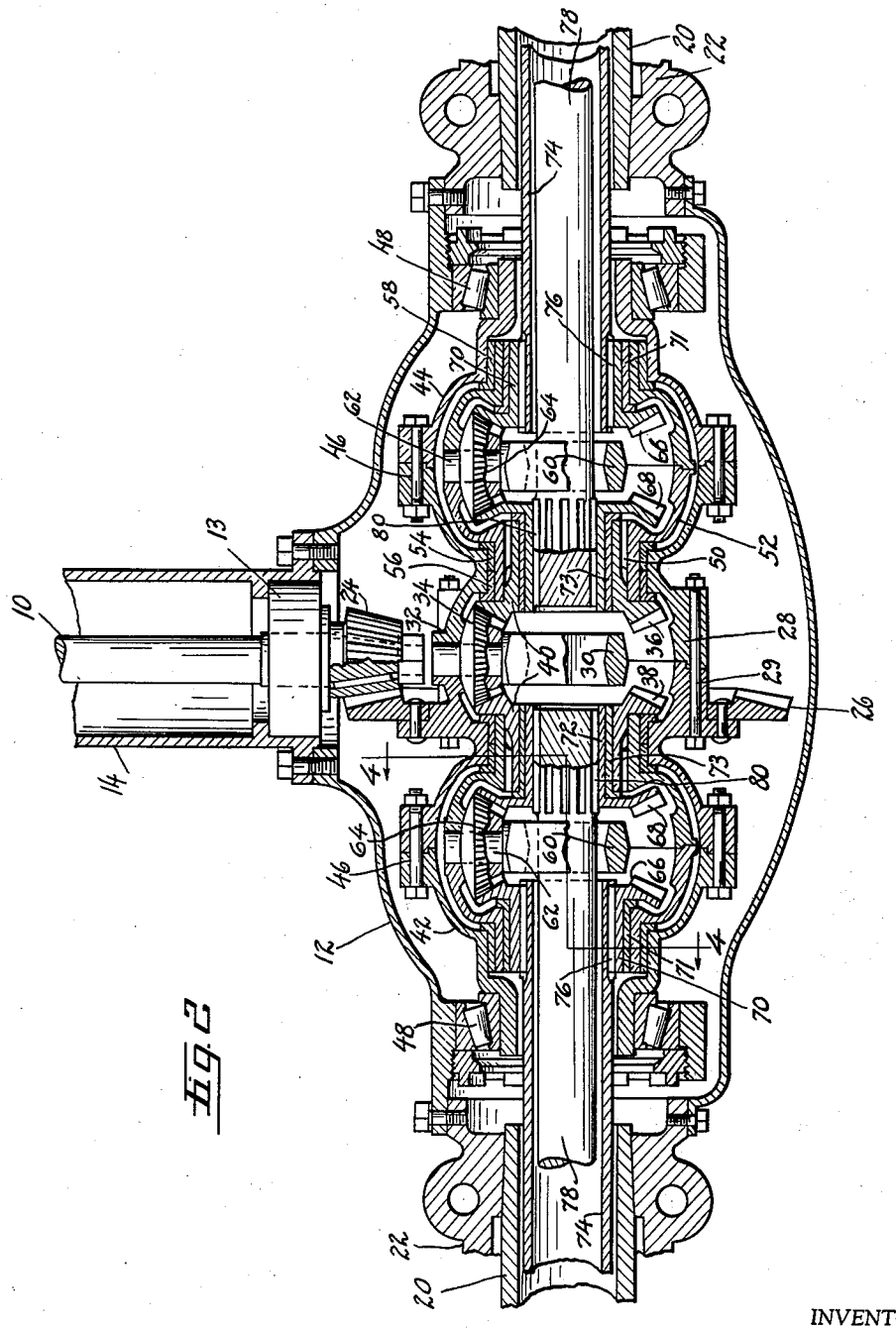
INVENTOR.
James F. Higbee
BY
Parker & Burton
ATTORNEYS.

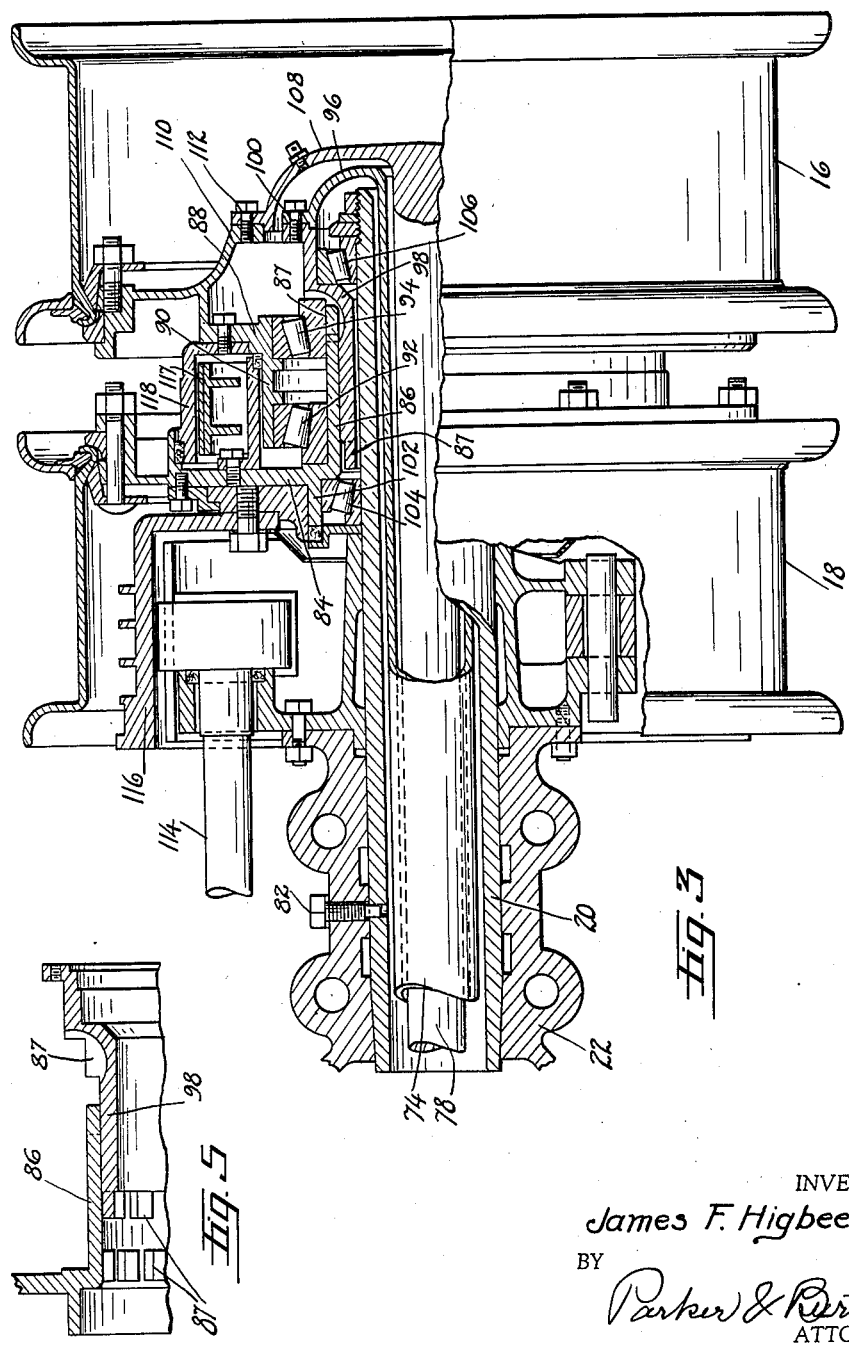

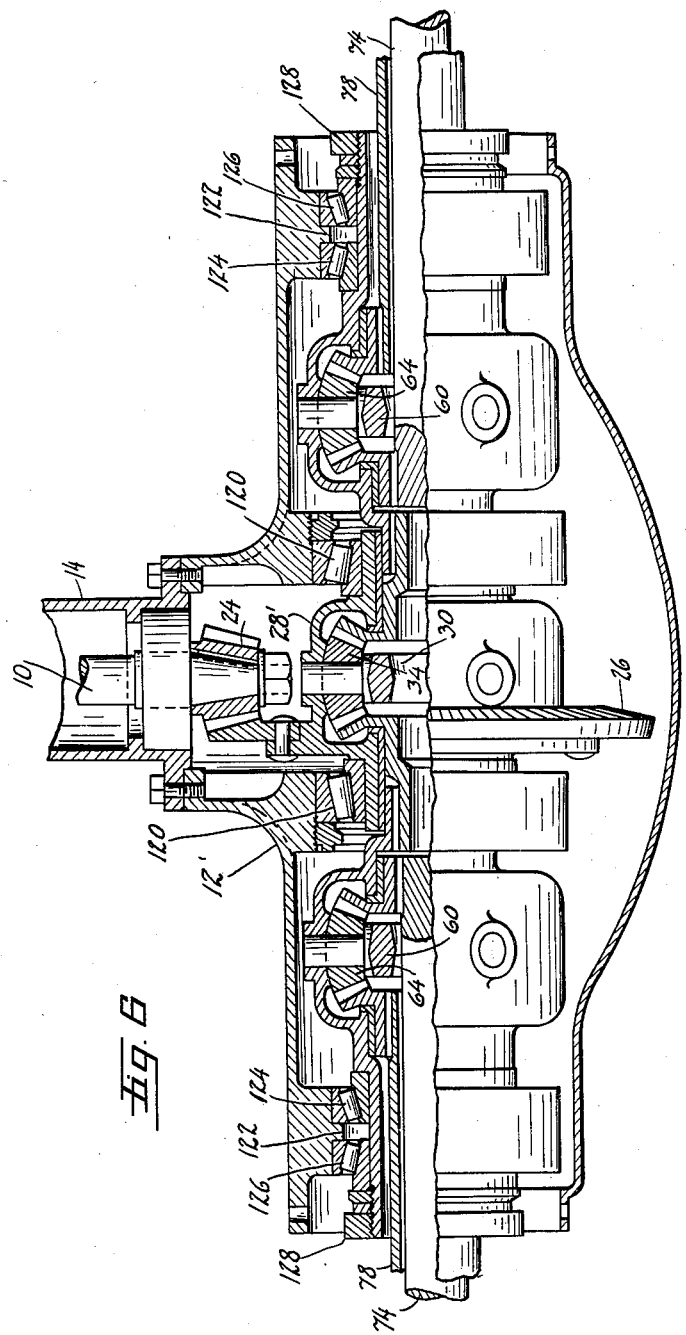

Patented Aug. 16, 1938

2,126,960

UNITED STATES PATENT OFFICE 2,126,960

INDEPENDENT DUAL WHEEL DRIVE

James F. Higbee, Detroit, Mich.

Application September 28, 1936, Serial No. 102,835

6 Claims. (Cl. 180—22)

My invention relates to automotive vehicles and has particular reference to vehicle structures wherein independently rotatable dual supporting wheel assemblies are utilized.

An object of the invention is to permit the use of such dual wheel assemblies for driving purposes as well as for simply supporting the load of the vehicle. Integrally associated dual wheels arranged side by side have long been utilized to carry heavy loads and the use of dual wheels mounted for independent rotation is rapidly becoming recognized as constituting a substantial improvement over the older type of integral assemblies. Considerable wear and tear on the tire casings is eliminated by the use of independently rotatable dual wheels and the steering of heavily laden trucks and trailers is substantially facilitated by the use of such wheel assemblies on the steerable axles.

In view of the many advantages of independently rotatable dual wheels it has become desirable to utilize such assemblies in conjunction with the drive axles of busses, trucks, etc., and such use makes important the provision of a differential drive assembly which may be coupled with the drive shaft of the vehicle and with each of the independently rotatable wheels of each dual wheel assembly to drive the same.

In carrying out the object of this invention I propose to utilize a substantially conventional primary differential mechanism with which is associated a pair of what may be regarded as secondary differential assemblies. The secondary differentials are driven by the primary differential. Each secondary differential drives one dual wheel assembly. Such secondary differential is coupled through two live axles with the independently rotatable wheels of its dual wheel assembly. The differential action of the secondary differentials permits the drive to be transmitted from the primary differential through each wheel of each dual wheel assembly, and the primary differential accomplishes its usual function in permitting differential movement between the respective secondary differentials.

Various other objects and meritorious features of this invention will be apparent from the following description taken in conjunction with the drawings wherein like numerals refer to like parts throughout the several figures and wherein:

Figure 1 is a top plan view of the drive assembly,

Fig. 2 is an enlarged horizontal section through the differential assembly of Fig. 1, Fig. 3 is a section through the wheel assembly of Fig. 1 illustrating the drive connections with the independently rotatable wheels, Fig. 4 is a section along 4—4 of Fig. 2, Fig. 5 is an assembly drawing in section illustrating the manner in which the inner wheel is coupled with its drive shaft, and Fig. 6 illustrates partly in section a somewhat modified form of improved differential assembly.

Referring now to Fig. 1, the numeral 10 represents the drive shaft of any type of motor vehicle. This shaft is connected with the differential structure within the differential housing 12 by means of a bearing assembly 13 of any suitable type. The bearing is enclosed within the housing structure 14 which is bolted to the differential housing. The dual wheel assembly comprises two juxtaposed independently rotatable wheel units 16 and 18 connected in a manner to be described in detail hereinafter with respective drive shafts. The axle housing 20 is secured to the differential casing 12 in some suitable manner, as by means of the flange connecting units 22.

The drive shaft 10 (Fig. 2) operates through the bearing 13 to rotate a drive pinion 24, which drive pinion engages with the bevel gear 26 secured to the differential casing 28 to rotate the casing. This primary differential assembly may be of any suitable standard type which includes an annular ring 30 provided at spaced intervals around its periphery with radially projecting studs 32 which studs support the compensating gears 34. Said compensating gears 34 are in mesh with a pair of oppositely disposed bevel gears 36 and 38 which are positioned within the differential casing by means of hubs 40. In the conventional differential structure these bevel gears 36 and 38 would be fixedly positioned at the inner ends of the respective right and left rear axles, but in the improved structure herewith illustrated they function to drive a pair of secondary differential assemblies.

The differential casing 28 is composed of a central casing section made up of complementary halves held together by bolts 29 and two end sections 42 and 44, the end sections being bolted to the central section as indicated at 46. The complete integral casing thus formed is provided with bearings 48 at its outer extremities to permit free rotary movement within the housing 12.

Each of the hubs 40 is splined as indicated at 50 to a secondary differential casing 52, which secondary casing is rotatably mounted within the casing 28 by means of hardened spacing rings 54, 56, and 58. An annular ring 60, similar in design to ring 30, and including radially projecting studs 62 positions the compensating gears 64 associated with each of the secondary differentials. Oppositely disposed bevel gears 66 and 68 are adapted to mesh with the said compensating gears 64, in the same manner as heretofore described with relation to the primary differential. Bevel gear 66 includes a hub portion 70 supported for rotation by hardened spacer 71 within casing 52. Bevel gear 68 includes a hub portion 72 mounted within spacer 73.

The hub 70 of the outer secondary bevel gear 66 is splined to a hollow axle 74 as indicated at 76. The hub 72 of the inner secondary bevel gear 68 is splined to a solid drive shaft 78 as indicated at 80.

It will therefore be apparent that a primary differential is provided which is operable to actuate a pair of secondary differentials, each of which secondary differentials is provided with the customary oppositely disposed bevel gears. Said bevel gears are positively coupled with a pair of drive shafts respectively, one drive shaft being positioned within the other. One drive shaft drives one of the dual wheels of the adjacent pair of dual wheels and the other drive shaft drives the other wheel of the pair.

Referring now to Fig. 3 it will be apparent that the drive shafts 74 and 78 extend out through the axle housings 20 from the secondary differentials to the adjacent driven dual road wheels. The axle housing, incidentally, may be tapered adjacent its inner extremity as indicated in Fig. 3 and the flanged connecting unit 22 may be provided with a positioning bolt 82 adapted to engage an aperture in the said axle housing to firmly position the differential housing 12 with respect to said axle housing. The inner wheel unit includes a wheel disc 84 provided with an outwardly axially extending tubular flange 86 and the outer wheel unit 16 includes a wheel disc 88 provided with an inwardly axially extending tubular flange 90. These projecting flanges are disposed in telescoping arrangement and a pair of bearings 92 and 94 is disposed between them to function to permit independent rotation of the said wheels with respect to one another.

The axle 74 projects out beyond the end of the axle housing 20 and is provided with a turned back flange 96 which is bolted to the end of a sleeve 98 as at 100. This sleeve is rotatably positioned on the axle housing and is telescoped within and splined to both ends of flange 86 of the inner wheel. This drive connection is clearly illustrated in Fig. 5, wherein the sleeve 98 and tubular flange 86 are withdrawn to illustrate the manner in which the two units are splined. The inner wheel disc 84 is likewise provided with an annular flange 102 which operates to position a bearing assembly 104. Another bearing assembly 106 is positioned between the outer flanged extremity of the sleeve 98 and the outer extremity of the axle housing 20.

Drive shaft 78, as indicated, extends through the hollow drive shaft 74 and projects therebeyond. The extremity of said axle shaft is provided with a radially extending flange 108 which is secured to the annular flange 110 of the outer wheel as indicated at 112.

In Fig. 3 retarding means have been illustrated in association with each of the independently rotatable wheels. This retarding mechanism is operated through actuation of a brake operating cam shaft 114 to actuate the retarding mechanism for each of the wheels respectively. Actuation of the retarting means within the brake drum 116 of the inner wheel automatically functions to expand a pair of brake shoes 117 positioned within a secondary brake drum 118, such secondary drum being secured to the outer wheel disc 88 by means of bolts. This retarding mechanism has been described in detail in my Patent, No. 2,001,875, dated May 21, 1935, and will not be set forth herein.

A somewhat modified form of dual differential assembly has been illustrated in Fig. 6 of the drawings. The general arrangement of parts and the functions thereof with relation to one another are the same in every respect as in the structure of Fig. 2. The primary difference resides in the different shape and construction of the differential housing 12' which permits the insertion of bearings 120 between the primary differential casing 28' and the said casing 12'.

A further distinction resides in the provision of an annular shoulder 122 around the inner periphery of the outer extremities of the housing 12' on each side of which is positioned a bearing assembly 124 and 126 respectively. By this arrangement the entire assembly may be tightened up simultaneously after wear on the bearings by rotating the cap nut 128, the outer bearing 126 being forced longitudinally against the annular shoulder 122 which, in turn, operates through the bearing 124 to urge the secondary differential assemblies toward the center of the compound assembly.

What I claim:

1. A motor vehicle having a drive shaft, a primary differential having a casing coupled with the drive shaft and having a pair of differential gears, each having a hub mounted within the casing, a pair of secondary differentials each having a casing coupled with the hub of one of the primary differential gears, each secondary differential including a pair of differentially driven gears within the casing, a housing enclosing the primary and secondary differentials, an axle housing secured to each end of the differential housing, a pair of independently rotatable dual road wheels mounted upon each axle housing, and an axle shaft coupling each secondary differential gear with one of the road wheels mounted upon the outer housing.

2. A motor vehicle having a drive shaft, a primary differential coupled therewith, a pair of secondary differentials arranged on opposite sides of the primary differential and coupled therewith to be driven thereby, a housing enclosing said primary and secondary differentials, each differential provided with a casing, bearings within the housing supporting the differential casings for rotation, and means arranged at opposite ends of said combined differential assembly adjustable to urge the secondary differentials toward the primary differential.

3. A motor vehicle having a drive shaft, a primary differential coupled therewith, a pair of secondary differentials arranged on opposite sides of the primary differential and coupled therewith to be driven thereby, a housing enclosing said primary and secondary differentials, said primary differential provided with a casing rotatably supported within said housing and having end portions enclosing the secondary differentials within the housing, each secondary differential provided with a casing supported for rotation within the corresponding enclosing end portion of the primary differential casing.

4. A motor vehicle having a drive shaft, a primary differential coupled therewith, a pair of secondary differentials arranged on opposite sides of the primary differential and coupled therewith to be driven thereby, a housing enclosing said primary and secondary differentials, said primary differential provided with a casing rotatably supported within said housing and having end portions enclosing the secondary differentials within the housing, each secondary differential provided with a casing supported for rotation within the corresponding enclosing end portion of the primary differential casing, an axle shaft housing supported as an extension at each end of said first mentioned housing, a pair of axially aligned road wheels supported upon each axle, a tubular drive shaft extending through each axle housing and coupling the secondary differential with the inner adjacent road wheel for driving, a second drive shaft extending from each secondary differential through the adjacent axle housing to the adjacent outer road wheel for driving.

5. A motor vehicle having a drive shaft, a primary differential having a casing coupled with the drive shaft and having a pair of differential gears, each having a hub mounted within the casing, a pair of secondary differentials each having a casing coupled with the hub of one of the primary differential gears, each secondary differential including a pair of differentially driven gears within the casing, a housing enclosing the primary and secondary differentials, said primary differential casing having end portions enclosing the secondary differential casing, said primary differential casing rotatably supported at opposite ends within said housing, an axle housing secured to each end of the differential housing, a pair of axially aligned road wheels supported upon each axle housing for independent rotation, a tubular axle shaft coupling each secondary differential through the adjacent axle housing with the inner road wheel mounted on the axle housing, and a second axle shaft coupling each secondary differential through the adjacent axle housing with the outer road wheel mounted upon the axle housing.

6. A motor vehicle having a drive shaft, a primary differential coupled therewith, a pair of secondary differentials arranged on opposite sides of the primary differential and coupled therewith to be driven thereby, a housing enclosing said primary and secondary differentials, an axle housing supported at each end of said first mentioned housing, a pair of axially aligned road wheels mounted side by side upon each axle housing, a tubular drive shaft extending from each secondary differential through the adjacent axle housing and having a part turned back over the end of the axle housing and connected through a tubular element rotatably encircling said axle housing with the innermost road wheel to drive the same.

JAMES F. HIGBEE.